Nov. 2, 1965  R. L. ORGO  3,215,022
APPARATUS FOR PROJECTED LIGHT EFFECTS
Filed May 15, 1964  3 Sheets-Sheet 1
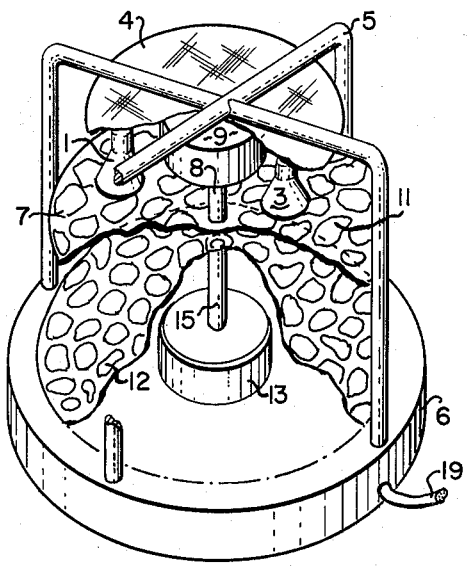
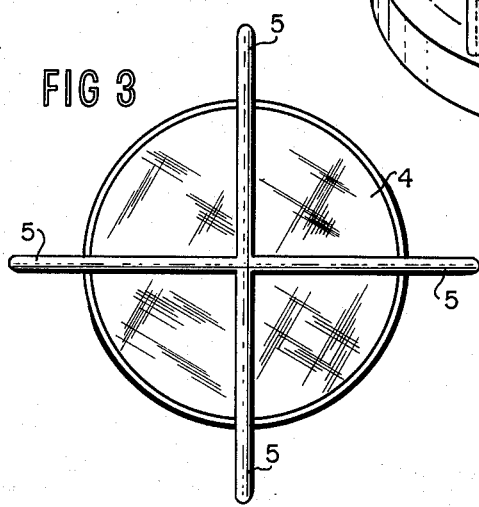
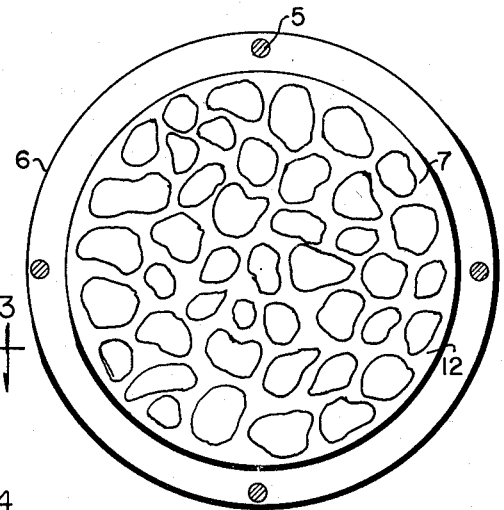
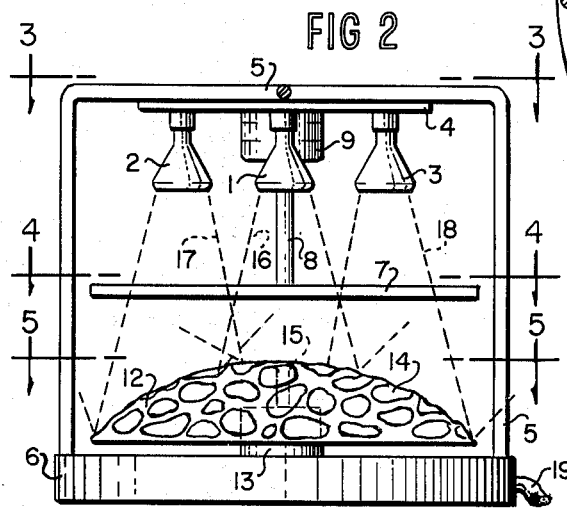
ROBERT L. ORGO
*INVENTOR.*
BY *R. E. Geangue*
ATTORNEY

ROBERT L. ORGO
INVENTOR.

BY *R.E. Geangue*

ATTORNEY

Nov. 2, 1965  R. L. ORGO  3,215,022
APPARATUS FOR PROJECTED LIGHT EFFECTS
Filed May 15, 1964  3 Sheets-Sheet 3

ROBERT L. ORGO
INVENTOR.

BY R. E. Geangue
ATTORNEY

United States Patent Office 3,215,022
Patented Nov. 2, 1965

3,215,022
APPARATUS FOR PROJECTED LIGHT EFFECTS
Robert L. Orgo, South Pasadena, Calif., assignor of thirty-three and one-third percent to Elden G. Chapman, Burbank, and thirty-three and one-third percent to Earl Gordanier, Pasadena, Calif.
Filed May 15, 1964, Ser. No. 367,748
5 Claims. (Cl. 84—464)

This invention relates to apparatus for projecting varying light and shadow effects onto the walls of a room or onto a screen and for changing the projected display in response to variations in audio signals as may be obtained from recorded musical sounds.

The apparatus of the present invention may be utilized for entertainment purposes or for educational purposes in connection with music or instrumental renditions. It can also be used to establish a pleasing and appropriate mood which is appealing to the eye. Also, it may be employed to establish decorative effects in a room or auditorium for entertainment purposes.

In addition to the above noted uses, the apparatus of the present invention may be used in psychological treatment and study, in advertising dispalys and to produce backgrounds for dramatic and theatrical presentations, notably in the field of color television.

The principal object of the apparatus of the invention is the production of an endless variety of light, shadow, and color patterns upon a suitable background which may comprise either the wall of a room or a screen, these light, shadow, and color patterns being projected in changing shapes and hues yielding harmonious contrasting patterns of various sorts, enhanced by the progessive changes being synchronized with input audio program material as may be obtained from live or recorded musical renditions.

A further object of the invention is the arrangement of a plurality of variable light sources each being responsive to a different band of audio frequencies, the light from said sources being directed as a moving pattern, by means of a motor-driven optical system, onto a reflecting surface.

A still further object of the invention is to provide novel and improved apparatus including independently variable light sources which have their outputs reflected upon a reflective background common to the light sources.

Still another object of the invention is the provision of novel and improved apparatus for modulating a plurality of light sources in response to variations in the amplitudes of corresponding portions of the audio spectrum of an audio input signal.

Still another object of the invention is the provision of novel and improved apparatus providing a plurality of color filters intercepting the paths of light from a plurality of light sources, with the color filters being rotatable with respect to said sources.

Yet another object of the invention is the provision of novel and improved rotatable reflector apparatus operable in conjunction with rotatable color-filters both of which intercept rays from a plurality of light sources for the projection of said rays therefrom.

Many other advantages, features, and additional objects of the present invention will be manifest to those versed in the art upon making reference to the detailed description and the accompanying sheets of drawings in which a preferred structural embodiment incorporating the principles of the present invention is shown by way of illustrative example.

In the drawings:

FIGURE 1 is a perspective view, partially broken away, of a preferred embodiment of the projection apparatus portion of the invention.

FIGURE 2 is an elevation view of the apparatus of FIGURE 1.

FIGURE 3 is a section view taken along line 3—3 of FIGURE 2.

FIGURE 5 is a section view taken along line 5—5 of FIGURE 2.

Figure 8:
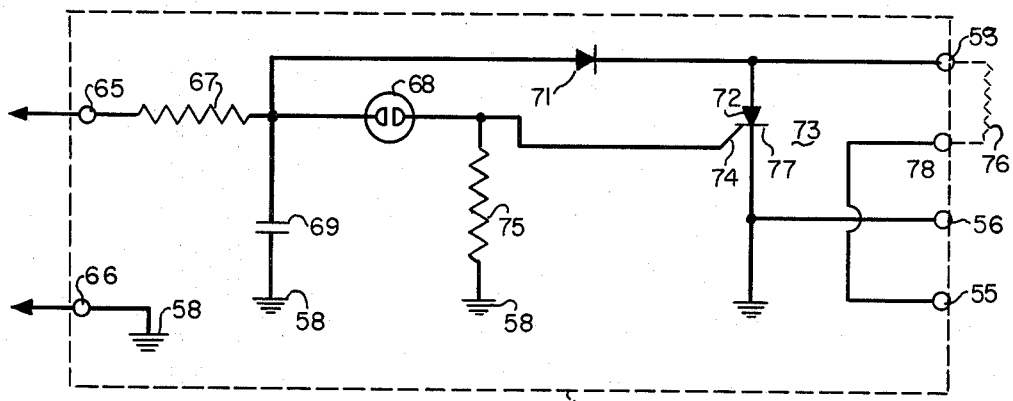
FIGURE 8 is a schematic diagram of the silicon controlled rectifier portion of the apparatus of FIGURE 6.

A preferred embodiment of the projection apparatus of the invention is shown in FIGURES 1–5. This apparatus comprises three high-intensity, reflector-type incandescent lamps 1–3 which, together with their required sockets and wiring, are supported by screen member 4. Screen member 4 is attached to tubular frame 5, both of which are designed to offer as little obstruction as possible to outwardly projected rays of light from the apparatus. Frame 5 is supported by base 6 which may be of any suitable construction. Frame 5 is preferably hollow so that the wires supplying current to lamps 1–3 may pass therethrough.

Lamps 1–3 are arranged to project a downwardly directed beam of light through circular, color-filter disc 7. The filter disc 7 is rotatably mounted on shaft 8 and is driven by an electric motor 9. Motor 9 is supported by screen member 4 and frame 5. The filter disc 7 comprises a circular frame having a plurality of apertures, in each of which is mounted a corresponding transparent color filter. A typical color filter is indicated at 11. The several color filters (11) mounted on disc 7 are of a variety of hues and are randomly arranged with respect to their various hues. While it is preferred that each filter (11) be of an irregular shape and size, this is not a necessary limitation of the invention. The light beams passing through the filters (11) in disc 7 are reflected from a plurality of concave mirrors which are mounted on circular convex-shaped rotating member 12 supported on motor shaft 15 and driven by motor 13. A typical one of the concave mirrors mounted on member 12 is indicated at 14. The mirrors (14) on member 12 may be of random shapes and sizes. Motor 13 is supported by base 6.

The reflected rays from the concave mirrors (14) are projected upon a suitable reflective background such as the walls and ceiling of the room in which the projection apparatus is placed. As can be seen in FIGURE 2, rays 16–18 from lamps 1–3, respectively, are reflected at various angles from the mirrors on member 12. The projection apparatus is placed at a suitable location in the room or area in which it is to be used, so as to permit the projected rays to be displayed on the walls and ceiling or onto a screen placed in the area for this specific purpose. Operating power is supplied to the projection device via cable 19.

Lamps 1–3 are illuminated in response to an electronic circuit which is controlled by the amplitude and the frequency of an audio input signal. As mentioned hereinabove, the audio input signal may be derived from any suitable source such as a tape recorder or an electrical musical instrument such as an electronic organ, or an electric guitar. The audio signal or program source is identified at 21 in FIGURE 6.

The audio signal appears on line 22 which supplies the input signal to the electronic control unit 23. In the usual application, line 22 would be bridged across the low impedance output terminals of the audio amplifier which is a part of the program source 21. This arrangement will be described more fully hereinafter in connection with FIGURE 9. The normal audio output from the source 21 may also be supplied to a loudspeaker in a conventional way so that the program material can be heard. The electronic control unit 23 does not interfere in any way with the normal operation of the program source to which it is connected.

The audio program signal appearing on line 22 is simultaneously applied to the inputs of three separate audio bandpass filters 24–26. These filters (24–26) comprise a high-frequency filter 24, a mid-range filter 25, and a low-frequency filter 26. Each of these filters is designed to pass a particular portion of the audio frequency spectrum. In a preferred embodiment, these filters (24–26) comprise broad-band filters which overlap somewhat and may be of any suitable and well-known construction. It should be understood, however, that filter 24 may be a high-pass filter and filter 26 may be a low-pass filter rather than a pass-band filter as is the case of filter 25.

In a typical construction, low-frequency filter 26 has a passband of 10 to 100 cycles, mid-range filter 25 has a passband of 100 to 1000 cycles, and high-frequency filter 24 has a passband of 1000 to 10,000 cycles per second. The output from each of these bandpass filters comprises a signal which is used to control the power gating circuit of an associated silicon controlled rectifier unit. More particularly, the portion of the audio spectrum passed by filter 24 is supplied via line 27 to silicon controlled rectifier unit 28. The mid-range frequency signals passed by filter 25 are supplied via line 29 to silicon controlled rectifier unit 31. The low frequency portion of the audio spectrum is passed by filter 26 and is supplied via line 32 to silicon controlled rectifier unit 33. Operating power is supplied to silicon controlled rectifier units 28, 31, and 33 from power supply 34 via line 35. The gated power outputs from silicon controlled rectifier units 28, 31, and 33 are supplied to projectors 36–38, respectively, via their associated lines 41–43, respectively. Each of the projectors (36–38) comprises an individual projection device of the type shown in FIGURE 1. The gated power output of each silicon controlled rectifier energizes a corresponding one of the three lamps in each of the three projectors 36–38.

The filtered audio signals appearing on line 27 will cause silicon controlled rectifier unit 28 to gate the power from power supply 34, appearing on line 35, and thereby modulate the average power supplied via line 41 to one lamp in each of the three projectors 36–38. Similarly, the average power appearing on lines 42 and 43 is modulated by silicon controlled rectifier units 31 and 33, respectively, and thereby modulate the average power supplied via lines 42 and 43 to corresponding lamps of the projectors 36–38. Incandescent lamps 1–3, due to their thermal inertia require a given time to reach thermal equilibrium. Inasmuch as the silicon controlled rectifiers are capable of switching on and off more rapidly than the lamps (1–3) are capable of following, these lamps will respond to the average power contained in the pulses from rectifier units 28, 31 and 33, and will exhibit a corresponding light intensity.

Due to the complex nature of the audio signal appearing on line 22, the frequency as well as the amplitude of these signals is continuously in flux. The power gating function, performed by silicon controlled rectifier units 28, 31, and 33, is responsive to both the frequency and the amplitude of the audio signal. Thus, high frequency components of the audio signal will cause the average light output or intensity of an associated lamp in each projector to vary directly in proportion to their amplitudes. Similarly, the mid-range components will control the brilliance of another lamp in each projector and the low frequency components control the light flux of the third lamp in each projector. The hues or colors from each projector are randomly varied in response to changes in the position of the filter disc described hereinabove. The spatial positions of the light rays emitted from each projector are under the control of the reflector disc described hereinabove and also randomly vary.

Figure 6:
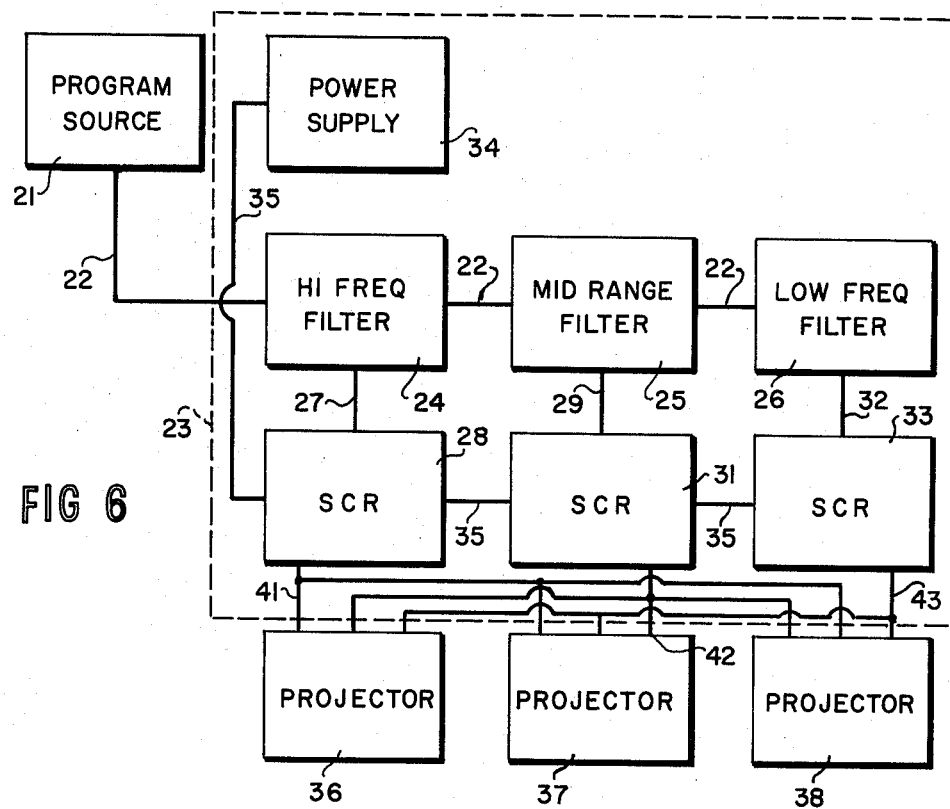
FIGURE 6 is a block diagram of the control apparatus portion of the invention.
Figure 7:
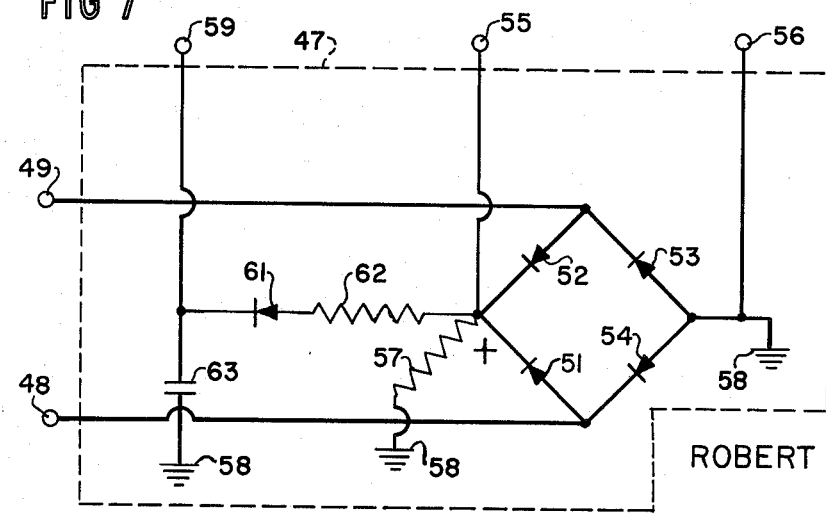
FIGURE 7 is a schematic diagram of the power supply portion of the apparatus of FIGURE 6.

Looking now at FIGURE 7 there is shown a schematic diagram of the power supply unit 47 which corresponds to block 34 of FIGURE 6. The power supply unit 47 comprises a full-wave rectifier consisting of diodes 51–54 arranged in a conventional bridge configuration, for supplying a positive operating potential, and a half-wave rectifier for supplying a negative operating potential. A.-C. input power is supplied to input terminals 48–49. The positive D.-C. output of the bridge rectifier is obtained between positive terminal 55 and ground terminal 56. A bleeder resistor 57 is connected between the positive terminal 55 and ground 58.

Motors 9 and 13 of each projector (see FIGURE 2) may be connected to terminals 48–49, via cable 19. A negative D.-C. voltage output is available between terminals 55–59 and is derived via diode 61 and series resistor 62. Filter capacitor 63 is connected between terminal 59 and ground 58.

Silicon controlled rectifier unit 64, shown in FIGURE 8, is typical of the units identified as 28, 31, and 33 in FIGURE 6. Audio input voltage is applied to terminals 65 and 66, the latter of which is connected to ground 58. The audio signal appearing at terminal 65 is supplied to series resistor 67 and shunt capacitor 69. The voltage at the junction between resistor 67 and capacitor 69 is applied to neon lamp 68 which operates as a firing trigger, as will appear hereinafter.

The junction between resistor 67 and capacitor 69 is also connected to the anode of diode 71, the cathode of which is connected to the anode 72 of silicon controlled rectifier 73. The anode 72 of silicon controlled rectifier 73 is also connected to output terminal 59. The control electrode 74 of rectifier 73 obtains its firing control voltage from neon lamp 68. Each time lamp 68 ignites, a pulse will appear at control electrode 74 which will cause conduction between anode 72 and cathode 77. Resistor 75 is connected between ground 58 and control electrode 74, and serves as the return path for the neon lamp's ignition circuit. Load 76 which actually comprises the resistance of the lamps in the projector units (e.g., 37–38) is connected across terminals 59 and 78. Terminal 78 is connected to the power supply 47 via terminal 55. The return path to the power supply 47 is via terminal 56.

Whenever the amplitude of the audio input signal appearing across terminals 65 and 66 is sufficiently high to cause neon lamp 68 to ignite, a voltage will appear across resistor 75 which is sufficient to cause silicon controlled rectifier 73 to conduct, since this voltage is applied to control electrode 74. As a result of conduction of rectifier 73, the supply voltage from power supply 47 (via terminal 55) will be applied to load 76. This will cause the projector lamp to light.

Figure 9:
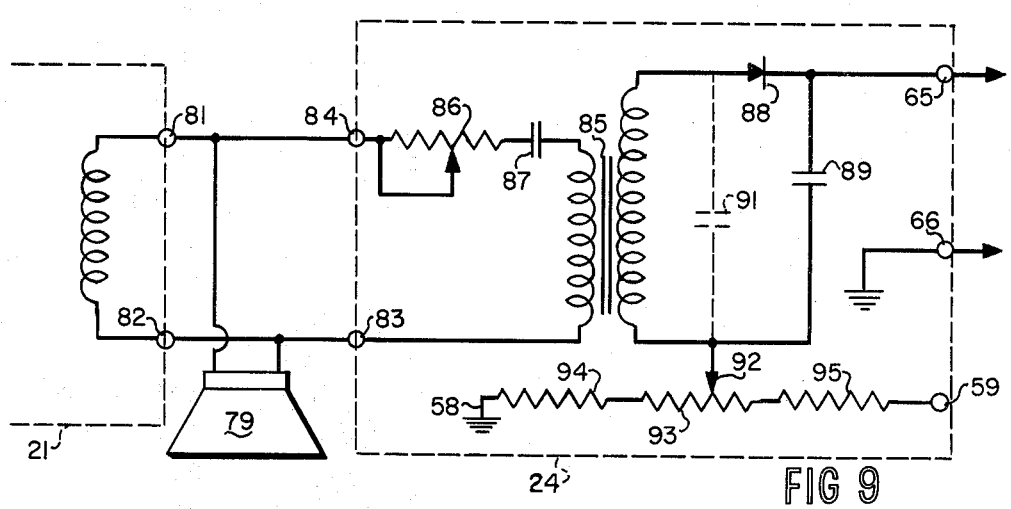
FIGURE 9 is a schematic diagram of the high frequency filter portion of the apparatus of FIGURE 6.
Figure 4:
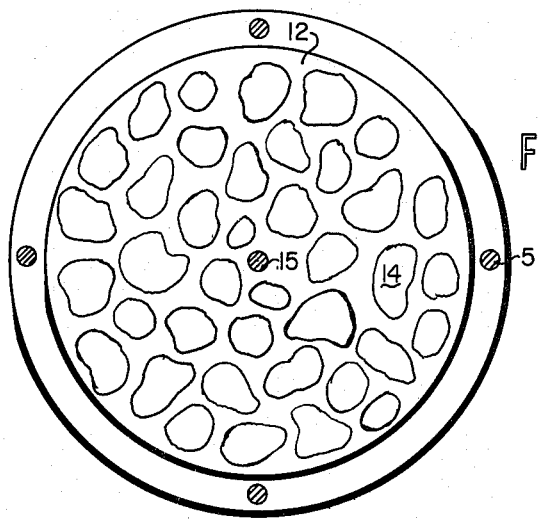
FIGURE 4 is a section view taken along line 4—4 of FIGURE 2.

There is shown in FIGURE 9 a schematic diagram of a typical one of the bandpass filters. The particular filter shown in FIGURE 9 corresponds to filter 24 of FIGURE 6 and comprises a high frequency filter. This filter has a pass band of approximately 1000 to 10,000 cycles per second. As was mentioned hereinabove, the gating control potential to each silicon controlled rectifier unit is derived from the output of the corresponding bandpass filter. Each filter unit comprises a pair of input terminals to which is supplied an audio signal from the program source 21. Any suitable type of RC circuit or RCL circuit may be used to provide the desired frequency response characteristic. Preferably the RC or RCL circuit is located ahead of an interstage impedance matching transformer. Such an arrangement will now be described in detail.

The program source 21 has its output terminals 81–82 connected to a loudspeaker 79 and also to the input terminals 83–84 of the high frequency filter 24. The audio signal is supplied to transformer 85 via a series RC circuit comprising a variable resistor 86 and series capacitor 87. This RC circuit comprises a high-pass filter. The secondary winding of transformer 85 is rectified via a half-wave rectifier comprising diode 88 and shunt capacitor 89. An optional smoothing capacitor 91 may be connected across the transformer secondary. Transformer 85 matches the relatively low impedance of the source to the high impedance of the silicon controlled rectifier firing circuit. The return path of the half-wave rectifier circuit is connected to the arm 92 of potentiometer 93 which is part of a voltage dividing circuit comprising resistors 94 and 95. These resistors are connected to opposite ends of potentiometer 93 between ground and the negative power supply terminal 59 (see also FIGURE 7). This voltage dividing circuit sets the ignition voltage threshold of the neon firing circuit, described hereinabove. Thus, the audio signal appearing across terminals 83–84 is converted to a series of relatively high-voltage pulses at terminals 65 and 66, which serve to ignite neon lamp 68. As a result, the projection lamps (e.g., lamps 1–3 of FIGURE 2) are illuminated in response to changes in the audio signal from source 21.

While the preferred embodiment, described hereinabove, contemplates the use of three separate projectors, each having three separate incandescent lamps, which in turn are responsive to separate portions of the audio spectrum, it will be readily appreciated that other arrangements of the system may be readily effected. For example, all of the lamps of each projector may be wired in parallel and connected to a corresponding one of the three silicon controlled rectifier units whereby each projector unit is responsive to one portion of the audio spectrum. The remaining projectors would then be responsive to their separate portions of the audio spectrum. This is in contradistinction to the above-described arrangement wherein each projector has separate lamps covering a portion of the audio spectrum. It should also be understood that the particular schematic circuits shown as representative of the corresponding blocks of FIGURE 6 may be substituted by any one of numerous devices for each respective function well known in the art. Other modifications will also be apparent to those versed in the art. For example, the audio spectrum may be divided into more or less than three channels, as desired.

Since certain changes may be made in the above described system without departing from the scope of the invention herein involved, it is intended that all matter contained in the above description and shown in the accompanying drawings shall be interpreted as illustrative and not in a limiting sense.

While there has been shown and described and pointed out the novel features of the invention as applied to a preferred embodiment, and since it is to be understood that various omissions and substitutions and changes in the form and details of the device illustrated and in its operation may be made by those skilled in the art, without departing from the spirit of the invention, it is intended that the invention be limited only as indicated by the scope of the following claims.

What is claimed is:

1. Audio signal controlled light projection apparatus comprising:
   a base member serving as a support for said apparatus;
   a frame extending upwardly from said base member;
   a plurality of lamp means mounted on said frame and arranged to direct the rays emitted therefrom in a generally downwardly direction;
   first motor means mounted on said base member;
   light reflector means rotatably supported by, and in driving relationship with, said first motor means, the reflective surface of said reflector means being in the path of said downwardly directed rays for diverting said rays in a generally outward direction away from said base member;
   a color filter disc interposed between said lamp means and said reflector means for imparting contrasting colors to said rays;
   second motor means rotatably supporting and in driving relationship with, said color filter disc for imparting rotary motion thereto; and
   power control means connected to said lamp means responsive to an audio signal for selectively varying the duration of power supplied to said lamp means.

2. Apparatus for projected light effects comprising:
   a plurality of spaced apart independent light sources for projecting rays of light in a generally downward direction;
   means for reflecting the projected light rays from said light sources in a generally radial direction along separate paths to a reflective surface common to said light sources;
   color filter means interposed between said light sources and reflecting means for intercepting the path of said projected rays, said color filter means comprising a plurality of transparent sectors of contrasting colors;
   first motor means for rotating said reflecting means about a vertical axis;
   second motor means for rotating said filter means about a vertical axis; and
   power control means connected to said light sources for independently varying the duration of power input to each of said sources in accordance with a corresponding one of a plurality of electrical control signals.

3. Apparatus as defined in claim 2 wherein said power control means comprises:
   a source of audio signals;
   a plurality of audio bandpass filters connected to said source of audio signals and each of which covers a separate portion of the audio spectrum;
   a plurality of power gating means equal in number to the number of said light sources and each having a control input, a power input, and a power output, each of said control inputs being connected to a corresponding one of said bandpass filters and each of said power outputs being connected to a corresponding one of said light sources; and
   a power supply connected to each of said power inputs for powering said light sources in response to variations in the outputs from said bandpass filters.

4. A system for producing projected light effects comprising:
   a plurality of light projection devices each having multiple light sources therein and each capable of projecting a plurality of independently controlled light beams upon a reflecting surface associated with each of said projection devices;
   a plurality of rotatable color filter means each of which is interposed between the multiple light sources of a corresponding one of said light projection devices and a corresponding reflecting surface for imparting contrasting colors to the light passing therethrough;
   a plurality of motor means each of which is in driving relationship with a corresponding one of said rotatable filter means for imparting a uniform rotary motion thereto;
   a power supply connected to said projection devices for powering all of said light sources;
   a source of audio signals; and
   a plurality of power control means interposed between said power supply and corresponding ones of said light sources in each of said projection devices and responsive to variations in the output of said source of audio signals to provide pulses of operating power to said corresponding light sources.

5. Apparatus for audio signal controlled projected light effects comprising:
  a light source for projecting rays of light;
  color filter means interposed in the path of said rays for imparting contrasting colors to the light passing therethrough;
  first motor means in driving relationship with said filter means for moving said filter means with respect to said light source;
  a plurality of light reflectors interposed in the path of the light passing through said filter means for directing the light falling thereon in a number of separate directions;
  second motor means in driving relationship with said light reflectors for moving said reflectors at a uniform rate with respect to said light source;
  a source of audio signals;
  a power source for supplying power to said light source; and
  gating control means connected between said power source and said light source, and responsive to the signals from said source of audio signals for controlling the power from said power source to said light source and thereby cause the projection of said rays to be proportional to said audio signals.

References Cited by the Examiner

UNITED STATES PATENTS

| | | | |
|---|---|---|---|
| 1,654,068 | 12/27 | Blattner | 84—464 |
| 1,977,997 | 10/34 | Patterson | 84—464 |
| 2,275,283 | 3/42 | Burchfield | 84—464 |
| 2,677,297 | 5/54 | Wetzel | 84—464 |
| 3,038,061 | 6/62 | O'Reilly | 84—464 X |
| 3,111,057 | 11/63 | Cramer | 84—464 |

OTHER REFERENCES

Publication: "Solid-State 3-Channel Color Organ," by Donald Lancaster, Electronics World, April 1963, pp. 55–58, 76–76.

LEO SMILOW, *Primary Examiner.*